Jan. 21, 1969  R. D. GRAYSON  3,423,062
SOLENOID PILOT OPERATED VALVE
Filed Sept. 27, 1967
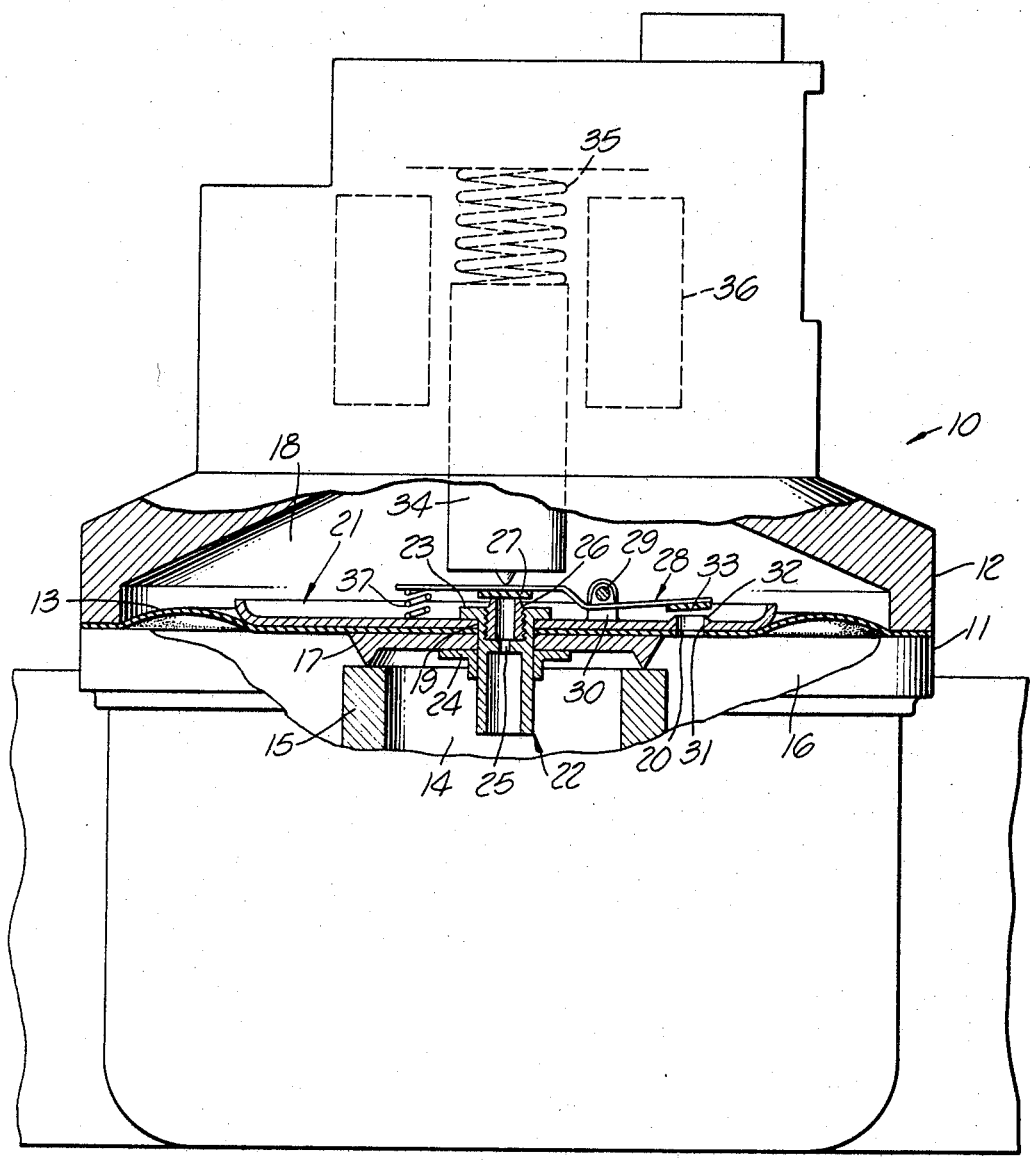
INVENTOR
R. D. GRAYSON
BY
ATTORNEY

United States Patent Office

3,423,062
Patented Jan. 21, 1969

3,423,062
SOLENOID PILOT OPERATED VALVE
Richard D. Grayson, Arcadia, Calif., assignor to International Telephone and Telegraph Corporation, New York, N.Y., a corporation of Maryland
Filed Sept. 27, 1967, Ser. No. 670,948
U.S. Cl. 251—30     5 Claims
Int. Cl. F16k *31/06, 31/145;* F17d *3/00*

ABSTRACT OF THE DISCLOSURE

The disclosure is drawn to a diaphragm operated main valve which may be maintained opened or closed by inlet pressure. The diaphragm has a first hole therethrough to allow inlet pressure to hold the main valve in a closed position. The inlet closing pressure may then be slowly bled off into the outlet by a second constricted hole through the diaphragm. Only one of the holes is closed at a time by one of two corresponding valves on a lever operated by a spring biased solenoid plunger. The constricted hole effects slow valve opening while the unconstricted hole effects rapid valve closing.

Background of the invention

This invention relates to the fluid flow controlling art, and more particularly to a diaphragm operated valve.

In the past valves which have been designed to close very rapidly also open very rapidly. Further, at the present time there is a demand for fast closing valves which slowly open.

Summary of the invention

In accordance with the device of the present invention, the above-described and other disadvantages of the prior art are overcome by providing a diaphragm operated valve in which inlet pressure is employed both to close the valve and to open the valve.

Inlet pressure is allowed to enter a substantially enclosed space behind the diaphragm through a first hole therethrough. Air in the said space is then allowed to escape into an outlet chamber through a constricted hole in the diaphragm. Selectively operable means are then provided to close only one of the holes at a time.

Thus, when the constriction hole is closed, inlet pressure closes the valve. When the unconstricted hole is closed, inlet pressure opens the valve.

Valve closing takes place at a rapid rate because of a lack of a constriction in one of the holes. However, valve opening takes place very slowly. This is true because air is allowed to escape from the said space into the outlet chamber only at a slow rate determined by the size of the constriction in the constricted opening.

The above-described and other advantages of the present invention will be better understood from the accompanying drawings when considered in connection with the following description.

Brief description of the drawing

In the drawing which is to be regarded as merely illustrative;

The figure is a side elevational view of a valve, partly in section, constructed in accordance with the present invention.

Description of the preferred embodiment

In the drawing, a valve body is indicated at 10 including a lower portion 11 and an upper portion 12 which are fixed together by any conventional means, not shown. A diaphragm 13 is fixed between valve body portions 11 and 12.

Body 10 has an outlet chamber 14 defined by a cylindrical port 15. Body 10 has an inlet chamber 16 which surrounds port 15. Inlet chamber 16 is sealed off from outlet chamber 14 by a main valve 17. Upper portion 12 of body 10 with diaphragm 13 provides a substantially fluid tight enclosed space 18. However, openings are provided through diaphragm 13 at 19 and 20. A backup or reinforcement plate 21 is fixed to diaphragm 13 and sealed thereto at least around opening 20. A vent tube 22 extends through diaphragm opening 19. Vent tube 22 has a flange 23 that holds plate 21 tight against diaphragm 13. Vent tube 22 also has a ring 24 fixed thereto which holds valve 17 tight against diaphragm 13. Vent tube 22 has a constricted opening 25 therein. Vent tube 22 also has an upper annular edge 26 which provides a seat for a valve 27 fixed to a lever 28. Lever 28, in turn, is pivoted at 29 between ears 20 fixed to plate 21.

Plate 21 has a hole 31 therethrough which terminates in an annular edge 32 which provides a seat for another valve 33 fixed to lever 28.

Valve 27 is normally closed by a solenoid plunger 34. Plunger 34 is biased downwardly by a spring 35. Alternatively, the weight of plunger 34 may close valve 24. Plunger 24 is operated by a solenoid 36.

In the operation of the device of the present invention, when solenoid 36 is deenergized, spring 35 forces plunger 34 downwardly and rotates lever 24 about pivot 29 so as to close valve 27. In this case, valve 33 is open, and the pressure of fluid in inlet chamber 16 exists on both sides of diaphragm 13 due to the fact that valve 33 is open, and the fluid in chamber 16 may flow through holes 20 and 31 in diaphragm 13 and plate 21, respectively.

The pressure in inlet chamber 16 is greater than that in outlet chamber 14. Thus, valve 17 is held in sealing engagement with cylinder 15.

When it is desired that valve 17 should be opened, solenoid 36 is energized. Plunger 34 is then raised. In this case, spring 37 rotaes lever 28 to the right, and opens valve 27. At the same time, valve 33 is closed. Fluid in inlet chamber then is permitted to flow through plate hole 31. The pressure of the inlet fluid above diaphragm 13 is then slowly bled off through restriction 25 in vent tube 22. The pressure of fluid in inlet chamber 16 then lifts diaphragm 13, plate 21 and all the structures fixed thereto so as to open valve 17. This condition is maintained until solenoid 36 is deenergized.

When solenoid 36 is deenergized, spring 35 urges plunger 34 against lever 28, and valve 27 is closed again. Inlet pressure then closes valve 17 in that fluid in inlet chamber 16 flows through plate hole 31 into the space inside body 10 above diaphragm 13. The closure of valve 27 prevents the escape of inlet fluid through vent tube 22.

In accordance with the foregoing, it will be appreciated that the relatively large size of holes 20 and 31 cause valve 17 to close in a relatively short time. On the other hand, the small size of the vent tube restriction 25 prevents fluid above diaphragm 13 from escaping to outlet chamber 14 at a high rate. This causes valve 17 to open slowly.

In accordance with the foregoing, it will be appreciated that if the inside diaphragm of vent tube 22 is small enough the use of the restriction 25 may be omitted.

Note will be taken that the device of the present invention will be employed in a diaphragm-type pressure regulator to provide a combination regulator and shut-off valve which will open slowly and close rapidly.

Although only one specific embodiment of the invention has been described and illustrated, many changes and modifications of the invention will suggest themselves to those skilled in the art. The invention is therefore not to be limited to the specific arrangements described herein, the true scope of the invention being defined only in the appended claims.

What is claimed is:

1. A fluid flow control device comprising: a valve body having an inlet chamber and an outlet chamber; a flexible diaphragm secured to the valve body and disposed over said outlet chamber movable away from said outlet chamber by the pressure of fluid in said inlet chamber; means fixed to a central portion of said diaphragm including a main valve on one side of said diaphragm to close said outlet chamber, said diaphragm having a first hole through its movable portions from said one side to the other side thereof communicating with said inlet chamber, said diaphragm being adapted to form a fluid tight space with said body on said other side of said diaphragm except for said first hole therethrough, said diaphragm having a constricted hole therethrough communicating with said outlet chamber; and selectively operable means to close each of said holes and to close only one of said holes at a time, the closing of said first hole causing the pressure of fluid in said inlet chamber to open said main valve by the said pressure of fluid in said inlet chamber as the pressure of fluid on said other side of said diaphragm is bled off slowly through said constricted hole, said main valve thereby slowly opening as said fluid flows slowly through said constricted hole.

2. The invention as defined in claim 1, wherein said selectively operable means includes a reinforcement plate on said other diaphragm side, a tube through said plate and said main valve, said plate, said tube, and said main valve being fixed together, said plate having a hole therethrough registering with said first hole, said diaphragm having a fluid tight seal to said plate around said first hole, a lever having first and second auxiliary valves thereon to close said first and constricted holes selectively, said lever having a fulcrum fixed to said plate intermediate said holes, a first spring to bias said lever in a direction to close said first hole, a solenoid having a plunger, a second spring to bias said plunger in a direction to cause said lever to close said constricted hole, said second spring thereby creating a predetermined moment to rotate said lever in a direction to close said constricted hole, said predetermined moment being greater than an opposing moment created by said first spring.

3. The invention as defined in claim 1, wherein said selectively operable means includes a vent tube through said constricted hole fixed to said diaphragm, said tube having an annular rib inside thereof to provide a restriction of fluid flow through said tube, the upper end of said tube providing a first auxiliary valve seat and a first auxiliary valve in a position to move toward and away from said first auxiliary valve seat to close and to open said first auxiliary valve.

4. The invention is defined in claim 3, wherein said selectively operable means includes a back-up plate fixed to a central portion of said other side of said diaphragm, said plate having a hole therethrough registering with said first diaphragm hole, said diaphragm being sealed to said plate around said hole on one side of said plate, the other side of said plate having a secondary auxiliary valve seat surrounding said plate hole, and a second auxiliary valve in a position to move toward and away from said second auxiliary valve seat to close and to open said second auxiliary valve.

5. The invention as defined in claim 1, wherein said selectively operable means includes a back-up plate fixed to a central portion of said other side of said diaphragm, said plate having a hole therethrough registering with said first diaphragm hole, said diaphragm being sealed to said plate around said hole on one side of said plate, the other side of said plate having an auxiliary valve seat surrounding said plate hole, and an auxiilary valve in a position to move toward and away from said auxiliary valve seat to close and to open said auxiliary valve.

References Cited

UNITED STATES PATENTS

| | | | |
|---|---|---|---|
| 2,417,994 | 3/1947 | Sheets | 251—45 X |
| 3,090,592 | 5/1963 | Fleer | 251—30 |
| 3,263,693 | 8/1966 | Ages | 251—30 X |

ARNOLD ROSENTHAL, *Primary Examiner.*

U.S. Cl. X.R.

251—45; 137—596.17